United States Patent [19]

Morris et al.

[11] Patent Number: 4,714,177
[45] Date of Patent: Dec. 22, 1987

[54] DEVICE FOR THE METERING OF A CHEMICAL, PARTICULARLY FOR SEED TREATMENT

[75] Inventors: David B. Morris; Andrew C. Rollett; Donald M. Roberts, all of Bury St. Edmunds, United Kingdom

[73] Assignee: Bayer Aktiengesellschaft, Leverkusen, Fed. Rep. of Germany

[21] Appl. No.: 882,667

[22] Filed: Jul. 7, 1986

[30] Foreign Application Priority Data

Jul. 26, 1985 [GB] United Kingdom ............ 8518943

[51] Int. Cl.$^4$ ............................................. B67D 5/00
[52] U.S. Cl. ..................................... 222/58; 222/89; 222/145; 137/408
[58] Field of Search ................ 222/58, 66, 129, 145, 222/89, 81, 64, 52, 160; 47/D9; 422/292; 137/408; 239/307

[56] References Cited

U.S. PATENT DOCUMENTS

| | | | |
|---|---|---|---|
| 2,731,246 | 1/1956 | Wallace et al. | 47/D9 X |
| 3,452,361 | 6/1969 | Williams, Jr. | 222/58 X |
| 3,749,285 | 7/1973 | Latham, Jr. | 222/58 |
| 3,843,020 | 10/1974 | Bardeau et al. | 137/408 X |
| 4,137,915 | 2/1979 | Kamen | 222/58 X |
| 4,397,422 | 8/1983 | Gwyn | 239/307 |
| 4,455,139 | 6/1984 | Gordon et al. | 222/58 X |
| 4,475,566 | 10/1984 | Haines | 222/81 X |
| 4,606,476 | 8/1986 | Pocock et al. | 222/148 |

Primary Examiner—Joseph J. Rolla
Assistant Examiner—Nils Pedersen
Attorney, Agent, or Firm—Sprung Horn Kramer & Woods

[57] ABSTRACT

To avoid internal and external soiling in a device for the metering of chemicals, particularly for seed treatment, a special storage system unit (1) is provided which can be loaded with disposable packages (3a, 3b, 3c) which are connected by means of couplings (13) to a supply line (16) leading to an atomizer (58), in which arrangement a metering unit (41) is arranged in the supply line (16) and the entire liquid-carrying system from the packages (3a, 3b, 3c) to the atomizer (58) is closed off to the working environment.

11 Claims, 15 Drawing Figures

DEVICE FOR THE METERING OF A CHEMICAL, PARTICULARLY FOR SEED TREATMENT

BACKGROUND OF THE INVENTION

The invention relates to a device for the metering of a chemical, particularly for seed treatment, consisting of a reservoir for the chemical, which is connected to an atomiser by means of a supply line via a metering unit and an actuating valve.

In the previously known devices of this type, the metering is much too inaccurate and conveying takes place with strong pulsation. Accordingly, the chemical application to the seeds is quite nonhomogeneous. Some seeds are grossly overtreated and others only receive partial treatment. Due to the dust and grain in the devices' working environment they are liable to associated blockages. Some products dry to form deposits of solids if air enters the system with a resulting possibility of filter and valve blockage.

SUMMARY OF THE INVENTION the objective is to provide a device by means of which, chemicals, particularly for seed treatment, are released in such a manner that deposits and blockages are avoided and continuous accurate metering of the chemical is assured.

The present invention thus provides a metering device of the type described, characterised by a storage system unit, the pack dispenser, which has a section for the reservoir in the form of a plurality of dispenser packs, the outlets of the dispenser packs being arranged to face downwards and each outlet being connected by means of a coupling to a manifold in the supply line, the couplings being automatically tightly closed when they are decoupled and the dispenser packs being associated with a hoist mechanism, such as carriages suspended on springs to which the packs are attached, which allow each pack to be emptied separately and sequentially, the pack currently to be emptied travelling upwards by means of the hoist mechanism at such a speed that, during the emptying process, the height of the liquid level referred to an arbitrary reference point of the fixed part of the metering unit, remains substantially constant and in which arrangement the entire liquid containing system from the packs to the atomiser is closed to the environment. The invention further provides such a metering device, per se, adapted to accept the dispenser packs as described above.

In a preferred arrangement the hoist mechanism is controlled by two latching systems, the lower system controlling the sequential release of the packs, the upper controlling the rise of the packs. Packs are released from the upper latching system only when they are substantially completely empty by the following pack in the mechanism sequence starting to rise, with only substantially completely empty packs being able to be released from the system.

Naturally, the packs and the pack dispenser are designed to be mutually compatible. Because the liquid level is kept at a substantially constant height above the metering unit, a constant hydrostatic pressure is maintained which acts as the inlet pressure on the metering unit and ensures consistent metering accuracy. During emptying all packs linked to the system will initially start to empty and due to loss of weight start to rise on their spring-loaded carriages until they reach the latches which allow their sequential release. At this point only one pack is free to rise, which it does and, because of its liquid level being higher than that in the restrained packs, chemical flows back into these packs as well as to the metering unit. Preferably the hoist mechanism comprises, at each pack location, mechanical sequencing latches and pairs of first and second higher latches, the mechanical sequencing latches being adapted initially to hold the packs in a lower position but to release the first pack automatically following loading of the set of packs, the first higher latch being adapted to restrain a pack at a final emptying position, the second higher latch being, adapted, on contact by the respective pack, to release the first higher latch associated with the immediately preceding pack location to release the pack in that location for further upwards movement and, the mechanical sequencing latches being further adapted to allow release of successive packs, on movement of the preceeding pack to the final emptying position. Thus, in use, the first rising pack is only allowed to rise to a final emptying position where it is held until the second, next, pack released by first pack rising to the final emptying position, itself starts to rise. Shortly after starting to rise past a lower set of latches the second pack contacts a higher set of latches, effecting the release of the first pack to the, higher, empty position. The second pack then continues to rise towards the emptying position and in doing so releases the third pack. It then remains in this position until released by the third pack starting to rise past the lower latches.

Naturally, the couplings and necks of the outlets of the packs must be matched to each other. Since the system remains sealed to the environment at all times once filled, deposits inside the system at critical places such as filters and valves, are avoided. The result of the closed supply system and the positive inlet pressure is consistent metering by the metering unit.

According to a particular embodiment of the device, the outlets of the packs are sealed with a pierceable foil and each coupling incorporates a piercing bit. This has the result that opening of the outlets takes place automatically as the couplings are applied.

According to a particular embodiment a, normally relatively small, water header tank which is connectable to a water supply is built into the metering module. Water is supplied directly from the header tank via a line to a metering head on the metering unit, the metering unit being constructed as a double unit having a second metering head for the chemical by means of which the chemical and water can be metered at a predetermined ratio and in which arrangement the line for water joins the supply line for the chemical downstream of the metering heads.

It is true that the addition of water in seed treatment is known. According to this embodiment of the present invention, however, the metering of the chemical and water at a constant, accurate ratio immediately before the release of this mixture is made possible for the first time. The double unit consists, for example, of two pumps having capacities corresponding to the desired ratio, the capacity of at least one pump being preferably adjustable. A prerequisite is the use of metering pumps, that is to say pumps having exactly defined capacities, so that the desired treatment or mix is retained.

A double-head diaphragm pump is particularly suitable as the dosing unit.

This type of pump guarantees accurate metering even at low rates of delivery.

Preferably, a pulsation damper and associated solenoid valve are allocated to the supply line downstream of the metering unit.

The pulsation damper causes the pulsating delivery flow to be smoothed so that the flow of the mixture leaving the supply line is essentially constant per unit time. The solenoid valve closes as soon as the metering unit ceases to operate so that the pulsation damper is not emptied.

To secure the device against damage by a blockage of the supply line, a safety switch responding to 'high' pressure is attached to the pulsation damper. Similarly, under supply is monitored by a switch responding to 'low' pressure.

These switches are set to upper and lower pressure limits and switch the device off if these are exceeded.

According to another particular embodiment, the design incorporates a third, liquid level, sensor switch in the supply line, upstream of the metering unit, which senses liquid presence, thus ensuring that the metering unit will only operate when there is a sufficient supply of liquid.

This sensor, too, emits an emergency signal, which causes the device to be switched off if the supply line is emptied at the inlet of the metering unit.

Preferably this sensor switch is also linked to an actuating valve which is opened when the sensor is activiated by low liquid. If the low liquid level is due to an air-lock this is relieved through the open valve. When product flows back to the sensor the valve is closed and the metering unit will restart. This is an automatic air-bleed system.

This has the particular advantage that, when the system is taken into operation, the air present in the line system can be bled off so that it does not need to be pumped off through the metering unit.

According to another preferred embodiment, a calibrating valve is arranged in the supply line between the metering unit and the atomiser. Calibration and adjustment of the metering unit is particularly simple in this manner.

A filter is preferably arranged in the supply line upstream of the metering unit.

The filter prevents contaminants possibly contained in the chemical from reaching the sensitive metering unit.

In its optimum embodiment, the device has significant advantages: chemical and water can be metered and mixed immediately before use; the enclosed liquid system prevents contamination; the dispenser unit can be loaded up to its maximum capacity with an arbitrary number of packages so that, in most cases, partly used packages do not need to be stored for a prolonged time in the device; during emptying, no air penetrates into the packs because they drain under gravity and are automatically pressed together by the air pressure from the outside; constant maintenance of a positive hydrostatic pressure on the supply improves the metering accuracy; the safety devices guarantee that the device will operate only under normal conditions. Naturally, alternative elements having the same function can also be used for the pulsation damper and the solenoid valve.

The new device is shown purely diagrammatically in an illustrative embodiment in the drawing and subsequently explained in greater detail, including its operation.

DETAILED DESCRIPTION OF THE INVENTION

Figure 1:
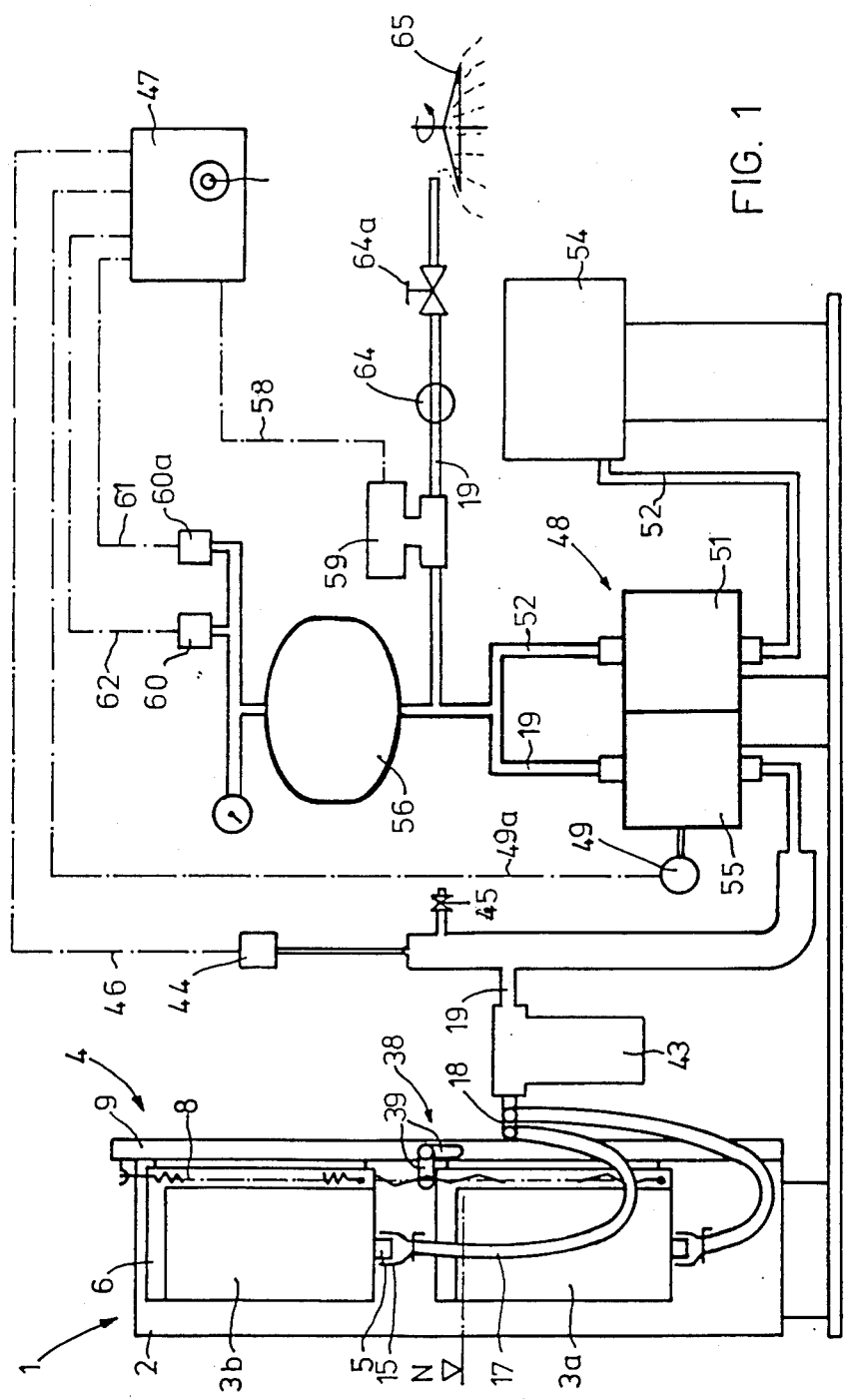
FIG. 1 shows the configuration of the device.
Figure 2:
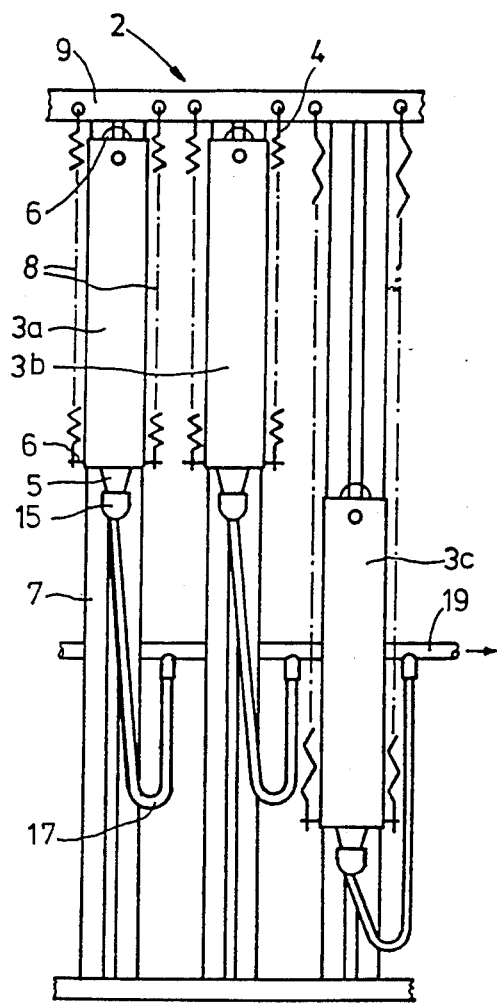
FIG. 2 shows a front view of the storage system unit, the pack dispenser of the device.
Figure 3:
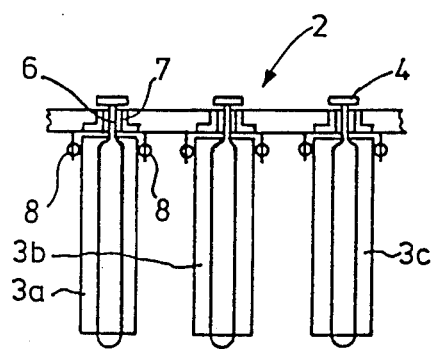
FIG. 3 shows a top view of the pack dispenser.

In FIGS. 1 to 3, 7 and 8, the device consists of a pack dispenser 1 having a section 2 in which several identical packs, 3a, 3b, 3c disposable when empty, are accommodated forming the reservoir. They are arranged in a hoist mechanism 4, their outlets 5 pointing downwards. The hoist mechanism 4 consists of a carriage 6 (FIG. 7(a) and (b)) for each pack 3a, 3b, 3c, which moves in and on rails 7. Each carriage 6 is attached to two springs 8. The latter are held at the top of the housing 9 of the section 2.

Figure 7A:
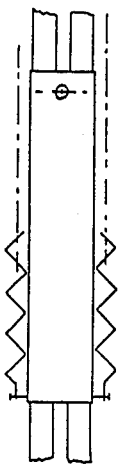
FIGS. 7(a) and (b) show the pack carriage.
Figure 7B:
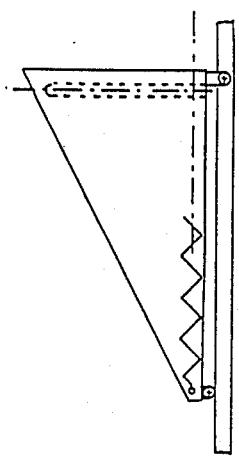
Figure 8A:
FIGS. 8(a) and (b) show the pack from two angles.
Figure 8B:
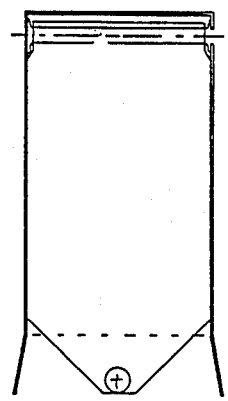
Figures 10A, 10B, 10C, 10D:
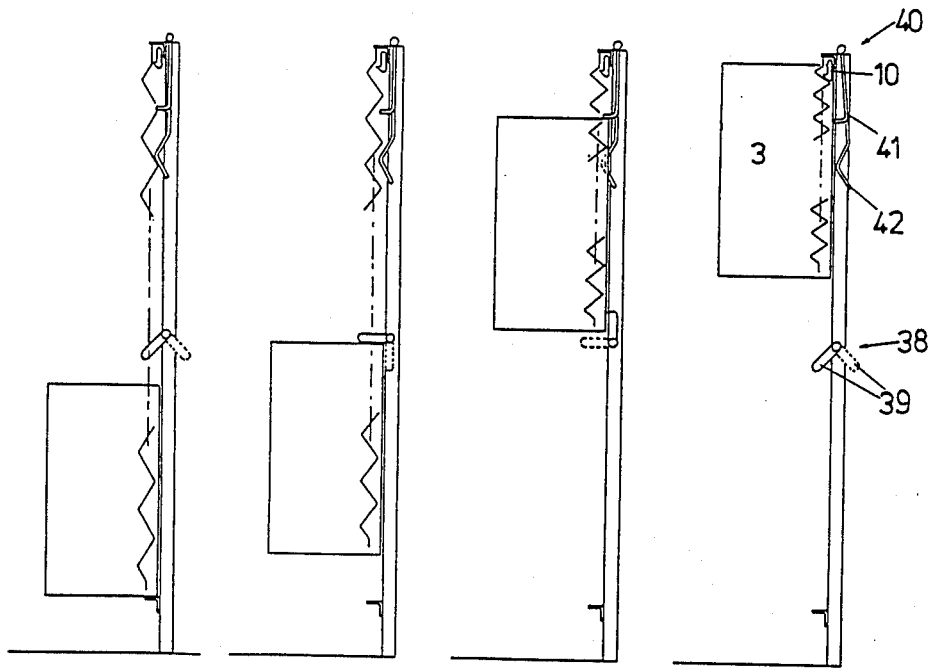
FIGS. 10(a) to (d) show the position of a pack during emptying in relation to the latching positions.
Figure 6:
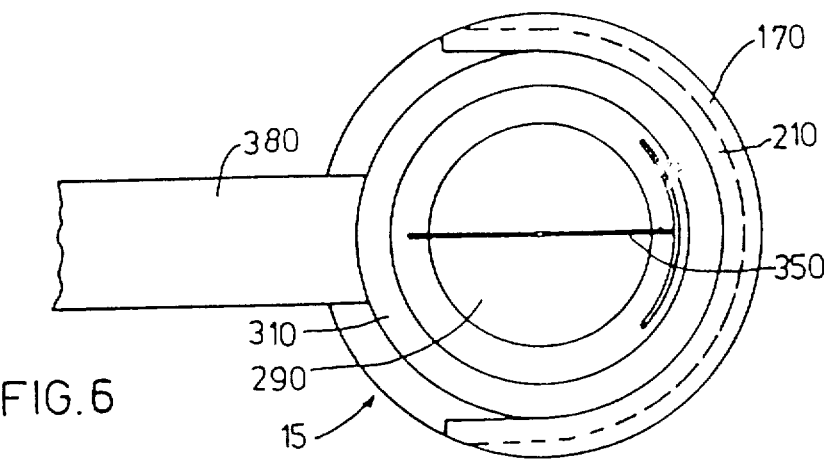
Figure 5:
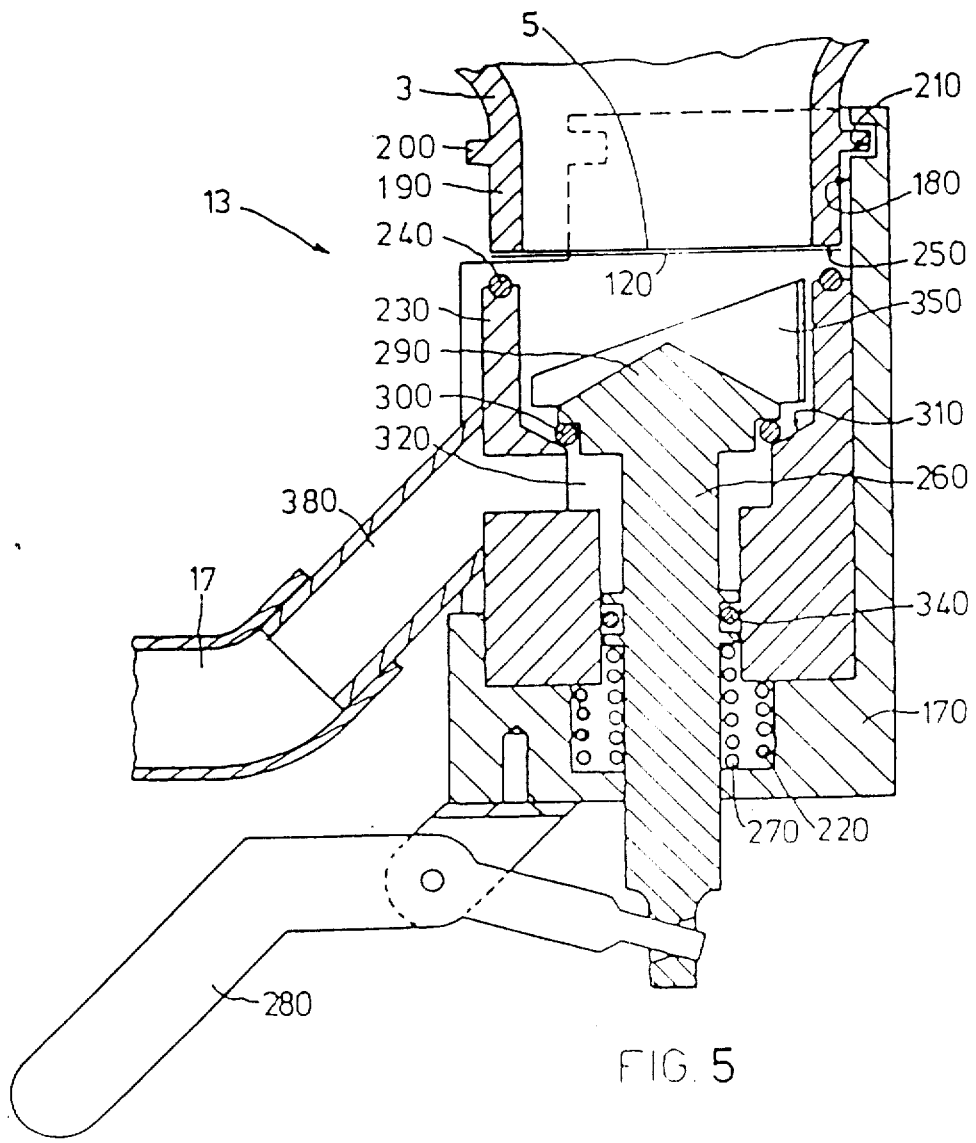
Figure 7A:
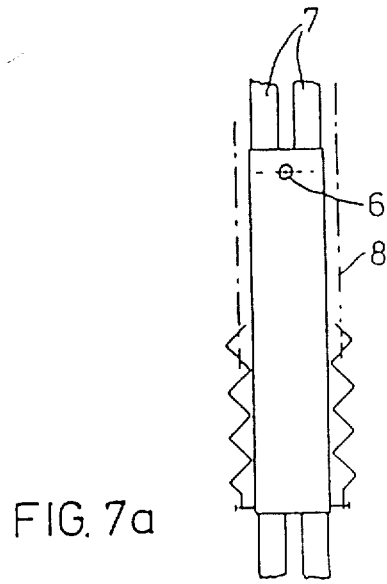
Figure 7:
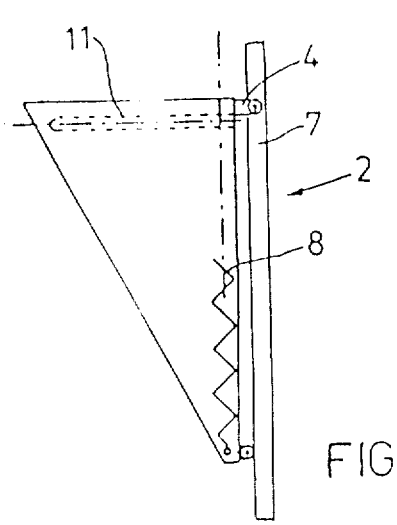
Figure 8A:
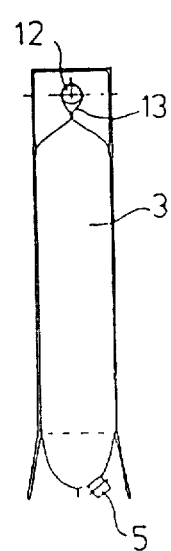
Figure 8:
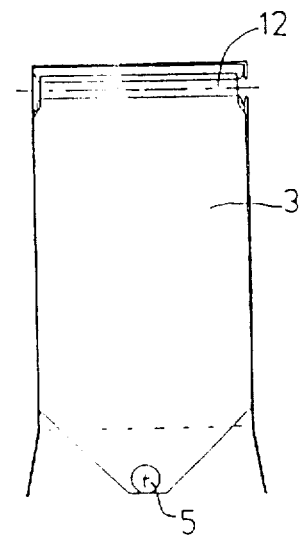

In the empty condition each carriage is held at the top of its travel in rails 7 by the tension in springs 8. Further, each is prevented from falling under load by latches 10 (FIG. 10). With carriages 6 in the top position empty packs 3 can be removed and full packs 3 attached to carriages 6. The carriages 6 contain a prong 11 which is designated to locate in the suspension bar 14 of the pack 3 (FIG. 8(a) and (b)). Attachment to the carriage 6 is achieved by sliding the suspension bar 12 exposed through hole 13, onto the prong 11 (FIGS. 7a and 7b). The pack 3 can be opened in this position to expose the outlet 5. Outlet 5 is always presented on the same side because the pack 3 can only be placed on the prong 11 in one direction as only one access hole 13 is provided and packs are always formed in the same way. The outlets 5, sealed with a foil 12, are connected to couplings 15 which can be manually operated. From these couplings, hoses 17 connect to a manifold 18 in the supply 19.

Figure 4:
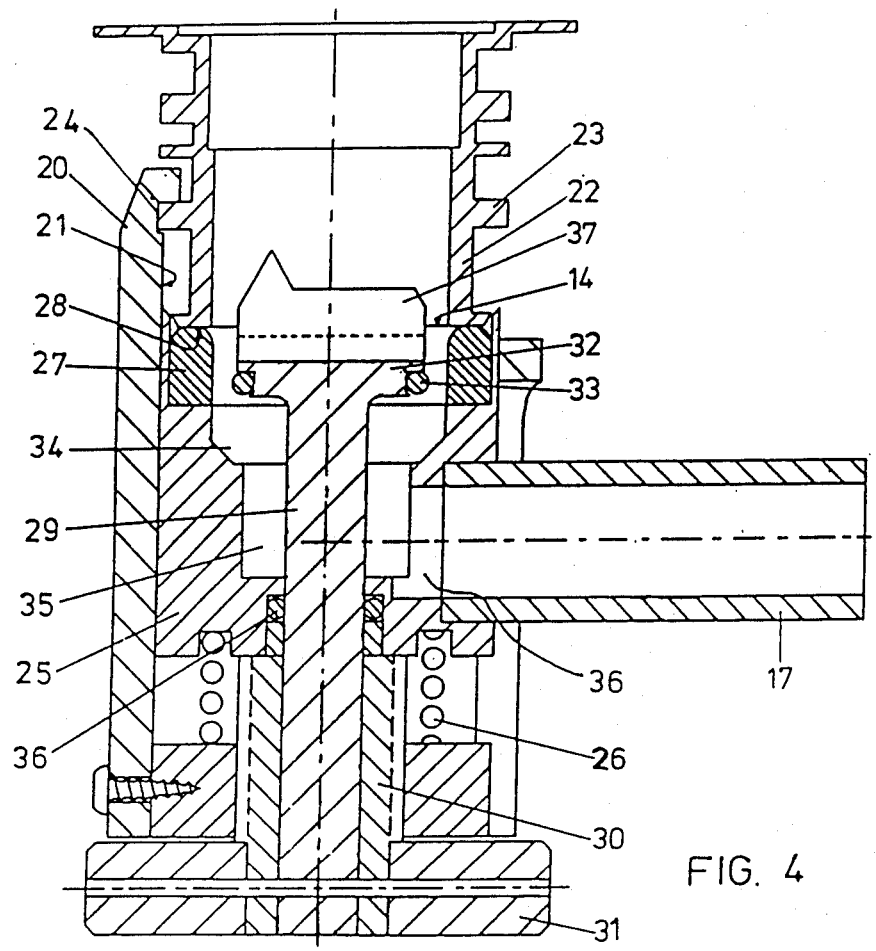
FIG. 4 shows a longitudinal section of a coupling of the device.

In one embodiment each of these couplings 15 (FIG. 4) is constructed as follows: a housing 20 has a bore 21 the diameter of which accommodates the outside diameter of the pack neck 22 of the outlet 5 of the package 3. The pack neck 22 is provided with a collar 23. In its upper area, the bore 21 is open for inserting the collar 23 over half of its periphery. A groove 24 is used for accommodating the collar 23. The bore 21 carries a sleeve 25 which is subjected to the pressure of a spring 26 in the direction of the pack 3. At its upper edge, the sleeve has a seal 27, which is constructed as a circular insert and which can rest against the face 28 of the neck 22. In the sleeve 25, a central stem 29 is carried which is supported by a coarse pitch operating screw 30 which screws into the base of housing 20. Attached to both stem 29 and operating screw 30 is handwheel 31. When the operating screw 30 is fully unscrewed cap 32 of stem 29 presses a ring seal 33 against an inner shoulder 34 of sleeve 25. Below this a drainage space 35 is located from a connection 36 with push fit hose 17. Below the drainage space 35, a seal 36 is also provided between stem 29 and sleeve 25. The cap 32 carries a piercing member 37.

When the operating screw 30 is unscrewed fully by means of the handwheel 31, the ring seal 33 in contact with shoulder 34 causes sleeve 25 to be drawn down within housing 20 compressing spring 26 and allowing pack neck 22 to be located in the top part of the housing 20.

As the operating screw 30 is turned initially the stem 29 and sleeve 25 advance together until seal 27 rests against the face 28 of the neck 22. Further advancement causes stem 29 to rise higher while rotating so that piercing member 37 cuts a circular hole in the foil 14. Simultaneously with this movement the sealing seat between the cap 32 and the inner shoulder 34 is opened and the chemical is released. After use, a pack can only be released by reversing this process by unscrewing operating screw 30 until sealing ring 33 again contacts shoulders 34 of sleeve 25, thereby closing off hole 17 from the environment. Only at this point is the pressure of seal 27 against sleeve 25 removed, allowing release of the pack.

In an alternative coupling arrangement each of the couplings 15 (FIGS. 5, 6) is constructed as follows: a housing 170 has a hole 180; the diameter of which matches the outside diameter of the neck 190 of the outlet 5 of the pack 3. The neck 190 is provided with a collar 200. In its upper area, the hole 180 is open for inserting the collar 200 over half of its periphery. A groove 210 is used for accommodating the collar 200. The hole 180 carries a sleeve 230 which is subjected to the pressure of a spring 220 in the direction of the package 3. At its upper edge, the sleeve has a seal 240, which is constructed as an O ring and which can rest against the face 250 of the neck 190. In the sleeve 230, a central pin 260 is carried which is supported at the housing 170, also via a spring 270. It is shown pulled back by means of a hand lever 280. In this arrangement, a cap 290 of the pin 260 presses a ring seal 300 against an inner conical shoulder 310 of the sleeve 230. Below this, a drainage space 320 is located from which a connection 380 with pushed-on hose 17 leads away. Below the drainage space 320, a seal 340 is also provided between the pin 260 and the sleeve 230. The cap 290 carries a knife-like piercing member 350. If the hand lever 280 is released, the seal 240 initially rests against the face 250 of the neck 190. The force of the spring 270 causes the pin 260 to be pushed higher so that the piercing member 350 pierces the foil 120. Simultaneously with this movement, the sealing seat between the cap 290 and the inner shoulder 310 is opened and the chemical can flow out.

Figure 9:
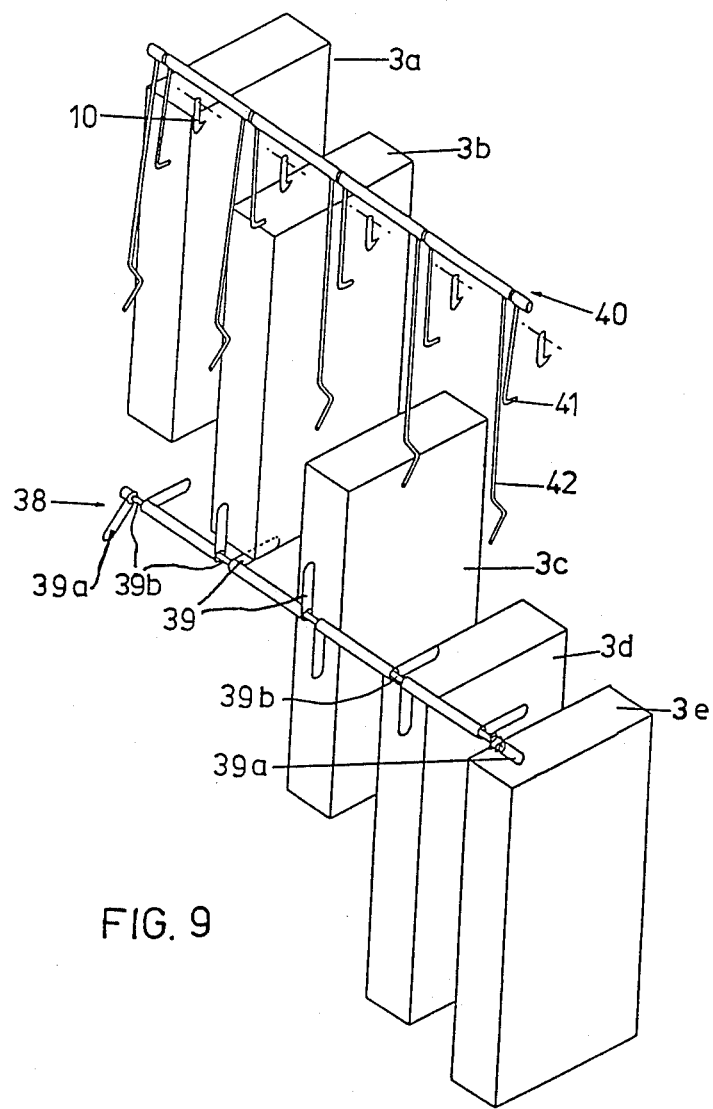
FIG. 9 shows a spatial representation of the position of packs during the emptying process.

When the appropriate coupling is attached, as previously described, the latch 10 is normally disengaged and the pack 3 is allowed to lower to the bottom position in the hoist mechanism 4. A mechanical sequencing system 38 (FIG. 9) consisting of sequencing latches 39 allows the packs to rise one by one in the set sequence during application of the chemical. When a pack 3a is released by the sequencing system 38 (see FIG. 10) it will continue to rise due to spring tension until it reaches the emptying position (FIG. 10(c)). At this position pack 3a is held by a further set of latches, the emptying latches 40 (consisting of a stop arm 41 and release arm 42), until the next pack 3b released from the sequencing latches by pack 3a rising to the emptying position, starts to rise and contacts the release arm 42 of the emptying latch 40. Pack 3a then will be released and allowed to rise to the empty position with the carriage 6 at the top of its travel and held by the latch 10 (FIG. 10(d)). This sequence continues as the successive packs empty, with pack 3b releasing pack 3c and being released to the empty position as pack 3c starts to rise. The bar 39b connecting the latches between the packs 3 at each end of the pack dispenser 1 is spring loaded so that if all the packs 3 are in the starting bottom position the spring loaded sequencing latch 39a will release under increasing load as chemical is used from the packs 3 and they rise to the sequencing latches 39. So the sequence can continue, each pack 3 is released to rise by its predecessor rising to the emptying position. This may be seen in FIG. 9, where the pack in the emptying position has allowed the associated latch to freely rotate on bar 39b, thereby releasing the third pack for upward movement. Because the right hand latch finger still bears against the third pack and therefore cannot freely rotate, an interconnected latch finger still retains the fourth pack from upward movement. The rating of the springs 8 is such that the carriage 6 will reach the top of the hoist mechanism 4 when it is loaded with an empty pack 3 and will be just below the sequencing latches 39 loaded with a full pack 3. In this particular embodiment packs 3 can only be removed from the pack dispenser when they are in the empty position. Similarly, they can only be connected in this position.

Chemical flows from the packs 3 into the manifold 18 via the couplings 15 and coupling hoses 17. From there it goes into the supply line 19 which contains a filter 43, a liquid-present sensor 44 and an automatic venting valve 45. If the supply line 19 empties, the liquid present sensor 44 supplies a signal via a cable 46 to a control box 47 and the device is automatically switched off. A metering station 48 is arranged in the supply line 19. This station consists of a double-head diaphragm pump which is driven via a motor 49. It is connected via a signal line 49a to the control box 47. The second head 51 of the metering unit 48 is connected via a line 52 to a water header tank 54. The chemical and water are metered at a predetermined ratio by the two heads 51, 55. At the outlet of the metering station 48, the water line 52 opens into the supply line 19. A pulsation damper 56 provides a uniform outflow from the supply line 19. In order to prevent the pulsation damper 56 from emptying during interruptions, a solenoid valve 59 is provided. It is connected via a signal line 58 to the control box 47 and from there obtains its closing or opening command. Safety valves 60a, 60, responding to an upper and a lower pressure limit value, also supply signals via signal lines 61, 62 to the control box 47. The on/off calibrate switch is designated by 63. Finally, a calibrating valve 64 and manually closable valve 64a are provided in the supply line 19. The supply line 19 opens to an atomiser 65 which is constructed as a centrifugal disc and which throws the chemical and water mixture onto the seed to be treated.

Terms such as "upwards" and "downwards" used herein refer to the orientation of the device in normal use.

We claim:

1. In a device for the metering of a liquid chemical, particularly for seed treating, having a reservoir for the chemical connected by a supply line to an atomiser via a metering unit and an actuating valve, the improvement comprising: a storage system unit which has a section for the reservoir in the form of a plurality of dispenser packs each having outlets facing downwards and each outlet connected by a coupling to a manifold in the supply line, means automatically tightly closing the couplings when they are decoupled and a hoist mechanism for the packs which allows each pack to be emptied separately and sequentially, the pack currently to be emptied travelling upwards by means of the hoist mechanism at such a speed that, during the emptying process, the height of the liquid level in that pack, referred to an arbitrary reference point of the fixed part of the metering unit, remains substantially constant and in which arrangement the entire liquid-containing system from the reservoir to the atomiser is closed off with respect to the environment, wherein the hoist mechanism further comprises, at each pack location, mechanical sequencing latches and pairs of first and second higher latches, the mechanical sequencing latches initially holding the packs in a lower position and releasing a first pack automatically following loading of a set of packs, the first higher latch restraining a pack at a final emptying position, the second higher latch on contact by the respective pack releasing the first higher latch associated with the immediately preceding pack location to release the pack in that location for further upwards movement and, the mechanical sequencing latches allowing release of successive packs, on movement of the preceeding pack to the final emptying position.

2. The device according to claim 1, wherein the hoist mechanism comprises carriages, suspended on springs, for attachment to the dispenser packs.

3. The device according to claim 1, wherein the outlets of the packs are sealed with a pierceable foil and each coupling is associated with a piercing member.

4. The device according to claim 1, wherein a storage header tank for water is connected to a metering head on the metering unit via a line, the metering unit comprising a double unit having a second metering head for metering the chemical and the water at a predetermined ratio and wherein the line for the water joins the supply line for the chemical downstream of the metering heads.

5. The device according to claim 4, wherein the metering unit consists of a double-head diaphragm pump.

6. The device according to claim 1, further comprising a pulsation damper and an associated solenoid valve connected to the supply line downstream of the metering unit.

7. The device according to claim 6, further comprising safety switches responding to pressure limit values connected to the pulsation damper.

8. The device according to claim 1, further comprising a liquid level sensor switch in the supply line upstream of the metering unit.

9. The device according to claim 8, further comprising an automatic venting valve in the form of a solenoid actuating valve associated with the liquid level sensor upstream of the metering unit acting as an automatic airbleed system.

10. The device according to claim 1, further comprising a calibrating valve in the supply line between the metering unit and the atomiser.

11. The device according to claim 1, further comprising a filter arranged in the supply line upstream of the metering unit.

* * * * *

UNITED STATES PATENT AND TRADEMARK OFFICE
CERTIFICATE OF CORRECTION

PATENT NO. : 4,714,177

DATED : December 22, 1987

INVENTOR(S) : David B. Morris, et al.

Figure 6:
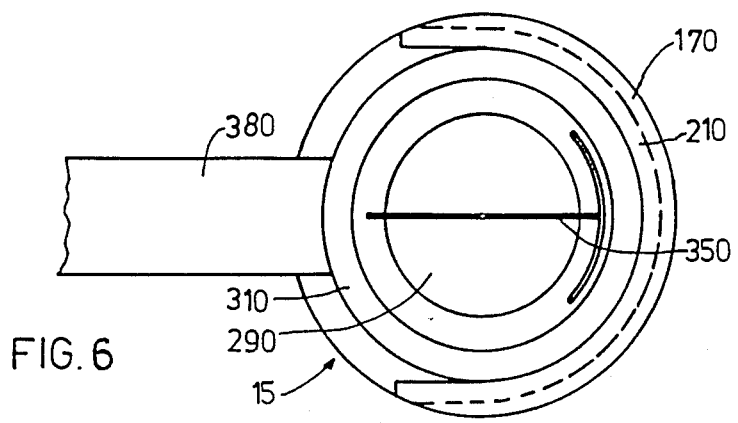
FIG. 6 shows a top view of the coupling of FIG. 5.
Figure 5:
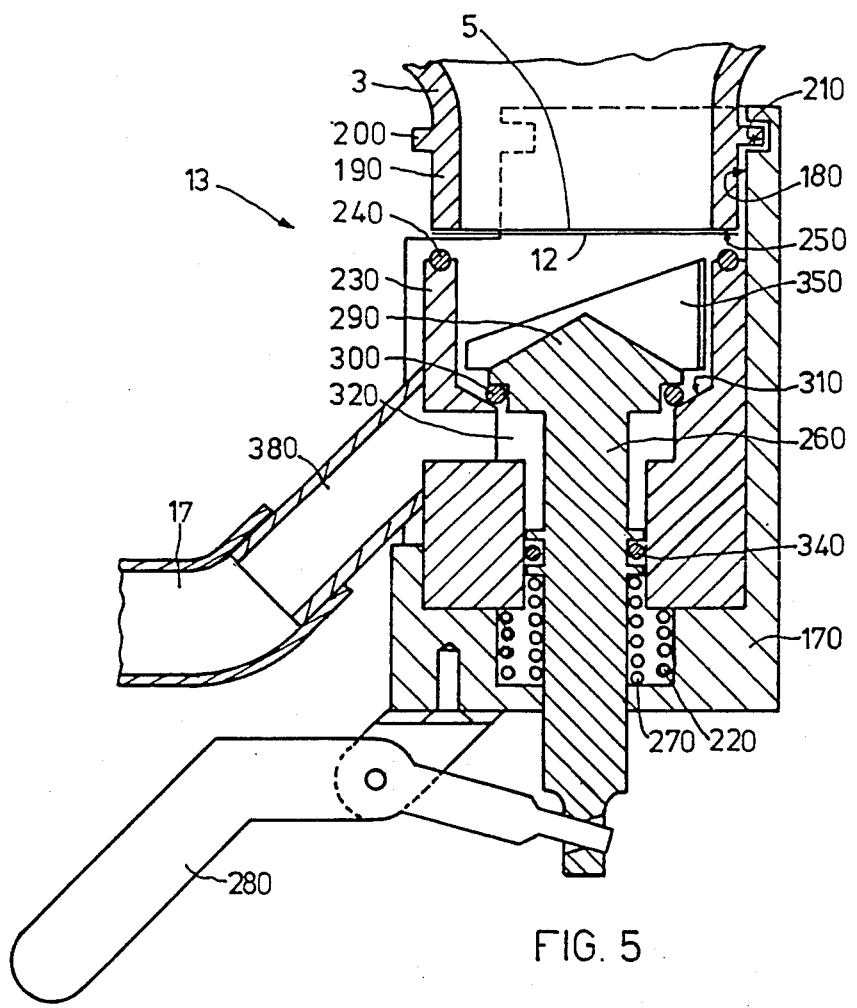
FIG. 5 shows a longitudinal section of an alternative coupling of the deive.

It is certified that error appears in the above-identified patent and that said Letters Patent is hereby corrected as shown below:

| | |
|---|---|
| Figs. 5, 6 | Delete sheet 4 of drawings and substitute attached approved Figs. 5 and 6 |
| Figs. 7a, b and 8 a, b | Delete sheet 5 of drawings and substitute attached approved Figs. 7a, b and 8 a, b |
| Col. 1, line 23 | Delete "the" and substitute --The-- at beginning of sentence |

Signed and Sealed this

Nineteenth Day of July, 1988

Attest:

DONALD J. QUIGG

Attesting Officer

Commissioner of Patents and Trademarks